US012532127B2

(12) United States Patent
Pinkerton et al.

(10) Patent No.: US 12,532,127 B2
(45) Date of Patent: Jan. 20, 2026

(54) ELECTROACOUSTIC DRIVERS AND LOUDSPEAKERS CONTAINING SAME

(71) Applicant: Brane Audio, LLC, Austin, TX (US)

(72) Inventors: Joseph F. Pinkerton, Austin, TX (US); James A. Andrews, Austin, TX (US)

(73) Assignee: Brane Audio, LLC, Austin, TX (US)

( * ) Notice: Subject to any disclaimer, the term of this patent is extended or adjusted under 35 U.S.C. 154(b) by 205 days.

(21) Appl. No.: 18/579,247

(22) PCT Filed: Jul. 18, 2022

(86) PCT No.: PCT/US2022/037456

§ 371 (c)(1),
(2) Date: Jan. 12, 2024

(87) PCT Pub. No.: WO2023/003807

PCT Pub. Date: Jan. 26, 2023

(65) Prior Publication Data

US 2024/0340595 A1 Oct. 10, 2024

Related U.S. Application Data

(60) Provisional application No. 63/223,390, filed on Jul. 19, 2021.

(51) Int. Cl.

*H04R 11/02* (2006.01)
*H04R 1/02* (2006.01)
*H04R 1/28* (2006.01)
*H04R 7/16* (2006.01)

(52) U.S. Cl.

CPC ............. *H04R 11/02* (2013.01); *H04R 1/025* (2013.01); *H04R 1/2803* (2013.01); *H04R 7/16* (2013.01)

(58) Field of Classification Search

CPC ...... H04R 11/02; H04R 1/025; H04R 1/2803; H04R 7/16; H04R 9/06; H04R 9/025
See application file for complete search history.

(56) References Cited

U.S. PATENT DOCUMENTS 2,951,190 A * 8/1960 Baermann .............. H04R 11/00 335/266

* cited by examiner

*Primary Examiner* — Tuan D Nguyen
(74) *Attorney, Agent, or Firm* — Dickinson Wright PLLC; Ross Spencer Garsson

(57) ABSTRACT

Electroacoustic drivers that can be utilized in loudspeaker systems that utilize drivers having a magnetic negative spring (MNS). The MNS has an asymmetrical magnet design so that it can cancel or partially cancel the differential air pressure force that is different between inward and outward movement of a sound panel.

31 Claims, 7 Drawing Sheets

ELECTROACOUSTIC DRIVERS AND LOUDSPEAKERS CONTAINING SAME

This application is a 35 U.S.C § 371 national application of PCT Application No. PCT/US22/37456, filed on Jul. 18, 2022, to Joseph F. Pinkerton et al., entitled "Electroacoustic Drivers And Loudspeakers Containing Same," which claims priority to U.S. Provisional Patent Application No. 63/223, 390, filed Jul. 19, 2021, 2021, to Joseph F. Pinkerton et al., entitled "Electroacoustic Drivers And Loudspeakers Containing Same," which patent applications are commonly owned by the owner of the present invention. These patent applications (including appendix thereto) are hereby incorporated by reference in their entirety for all purposes.

This application is also related to International 1 Patent Application No. PCT/US2020/051633, filed Sep. 18, 2020, to Joseph F. Pinkerton et al., entitled "Electroacoustic Drivers And Loudspeakers Containing Same," (the "Pinkerton '633 PCT application"). The Pinkerton '633 PCT Application is hereby incorporated by reference in its entirety for all purposes.

FIELD OF INVENTION

The present invention relates to electroacoustic drivers and loudspeakers that have and use same, and in particular drivers having a magnetic negative spring (MNS) (such as permanent magnet crown (PMC) drivers) and loudspeakers that have and use same.

BACKGROUND

FIG. 1 is a prior art audio force transducer 100 that includes a fixed magnetic flux path 101 (soft iron) having permanent magnets 102 and a sliding coil holder (also called an "armature") 103 having electric coil (also called a "voice coil") 104. The permanent magnets 102 are separated from the electric coil 104 with an air gap 105. The magnetic forces will cause the coil holder 103 to slide inward and outward in the z-axis direction (as shown in FIG. 1), which moves the panels of the loudspeakers (not shown) to produce the auditory sound.

As disclosed and taught in Pinkerton '633 PCT Application, large pressure forces on a sound panel (of an audio speaker) can be cancelled, or partially cancelled, by using a magnetic negative spring (MNS) as part of a reluctance assist driver (RAD) or a permanent magnet crown (PMC) driver.

FIG. 2A (which is FIG. 18D of the Pinkerton '633 PCT Application) shows a perspective view showing certain parts (mainly the permanent magnets) of a repulsive/attractive MNS. FIG. 2B shows a perspective view of the armature that was utilized in the repulsive/attractive MNS shown in FIG. 2A.

As shown in FIGS. 2A-2B (which provides movement of the coil holder along the z-direction), the voice coils are always immersed in the magnetic field (which makes the force per unit current input approximately constant at all armature positions).

The repulsive/attractive MNS shown in FIGS. 2A-2B has stationary magnetic poles (such as stationary magnetic north poles 1801*a*-1804*a* and stationary magnetic south poles 1801*b*-1804*b*), which are made with permanent magnets (in place of steel) and so the oppositely polarized moving magnets (such as moving magnetic north poles 1805*a*-1806*a* and moving magnetic south poles 1805*b*-1806*b*) on the armature are radially repelled by the stationary magnet poles (which provides radial stability). As shown in FIGS. 2A-2B, the stationary magnetic poles are permanent magnet rings (PMRs) and the moving magnetic poles are permanent magnetic triangles (PMTs). The PMR could be an assemblage of arc segments that, when combined, create a ring magnet structure.

When the armature is in the centered position (as shown in FIG. 18A of the Pinkerton '633 PCT Application), the positive z-direction array of PMT (moving magnetic north pole 1806*a* and moving magnetic south pole 1806*b*) is immersed in the oppositely directed magnetic field of the positive z-direction PMR (stationary magnetic north poles 1802*a* and 1804*a* and stationary magnetic south poles 1802*b* and 1804*b*) and thus is radially stable.

When the armature is in the partial negative z-direction position (as shown in FIG. 18B of the Pinkerton '633 PCT Application), this position the positive z-direction array of PMT (moving magnetic north pole 1806*a* and moving magnetic south pole 1806*b*) is partially immersed in the oppositely directed magnetic field of the positive z-direction PMR (stationary magnetic north poles 1802*a* and 1804*a* and stationary magnetic south poles 1802*b* and 1804*b*) and still radially stable. The axial/desired force in this position is high because the positive z-direction array of PMT (moving magnetic north pole 1806*a* and moving magnetic south pole 1806*b*) is being repelled by the positive z-direction PMR (stationary magnetic north poles 1802*a* and 1804*a* and stationary magnetic south poles 1802*b* and 1804*b*) and attracted by the magnetic fringing fields of negative z-direction PMR (stationary magnetic north poles 1801*a* and 1803*a* and stationary magnetic south poles 1801*b* and 1803*b*).

When the armature is in the full negative z-direction position (as shown in FIG. 18C of the Pinkerton '633 PCT Application), the positive z-direction array of PMT (moving magnetic north pole 1806*a* and moving magnetic south pole 1806*b*) is not immersed in the oppositely directed magnetic field of the positive z-direction PMR (stationary magnetic north poles 1802*a* and 1804*a* and stationary magnetic south poles 1802*b* and 1804*b*), but is partially immersed in the magnetic fringing field of the negative z-direction PMR (stationary magnetic north poles 1801*a* and 1803*a* and stationary magnetic south poles 1801*b* and 1803*b*) and this position still provides some radially stability. The axial/desired force in the position shown in FIG. 18C is also high because the positive z-direction array of PMTs is being repelled by the positive z-direction PMR magnetic fringing field and attracted by the negative z-direction PMR.

By symmetry, this same stability will be provided when the armature moves in the positive z-direction.

This provides a radial stabilizing force that helps to keep the armature centered within the air gap between the inner and outer permanent magnet rings.

FIG. 3 (which is FIG. 20 of the Pinkerton '633 PCT Application) shows a loudspeaker 2000 in which an MNS (such as shown in FIGS. 2A-2B) can be utilized. Loudspeaker 2000 has a sealed chamber 2001, a movable panel 2002 (which is connected to a flexible "surround" element 2005, such as made from rubber to allow movable panel 2002 to move in the positive and negative z-direction). Loudspeaker 2000 further includes MNS 2003, and voice coil 2004, which are positioned for moving movable panel 2002 in the positive and negative z-direction. Loudspeaker 2000 further includes sensor 2006 (such as position and/or velocity sensor, that can be an optical or inductive sensor) used to provide position or velocity feedback to a control circuit). In the orientation of FIG. 3 (shown by the x-z axis shown therein, with the y-direction perpendicular thereto), the movable sound panel 2002 moves outward and inward in the z-direction due to the z-direction movement of the armature. Such movement occurs due to the magnetic forces generated thereby.

When the sound panel is in its neutral/relaxed position, there are no forces acting on the movable sound panel 2002. When the movable sound panel 2002 moves in the positive z-direction, this creates a partial vacuum (i.e., a decrease in pressure) in the sealed chamber 2001. When the movable sound panel 2002 moves in the negative z-direction, this creates an increased pressure in the sealed chamber 2001. Thus, there are forces that are created by this movement due to the decrease/increase in pressure This decrease/increase in force can be partially or totally canceled with the MNS force of the permanent magnet triangle members of the magnetic negative spring moving elements moving through a radially directed magnetic field. This MNS force is approximately proportional to the width of the permanent magnet triangle that is immersed in the stationary magnetic field. Thus, this force increases as the permanent magnet triangle moves in the z-direction (just as the pressure force on the panel in the negative z-direction increases as the panel moves in the positive z-direction). When the panel pressure force is in the negative z-direction, the MNS force is in the positive z-direction, and, thus, these forces can be made to fully or partially cancel.

However, the decrease and increase in pressure force is not symmetrical. The movement of the panel in the negative z-direction (which increases pressure) requires a greater force to move a particular distance, as compared to the movement of the same particular distance in the positive z-direction (which decreases pressure). This pressure differential is due to the fact that sealed chamber 2001 is relatively smaller when the panel moves in the negative z-direction than when the panel moves in the positive z-direction.

Accordingly, a need exists to cancel, or partially cancel, the non-symmetrical pressure forces acting on a sound panel (of an audio speaker).

SUMMARY OF THE INVENTION

The present invention is directed to electroacoustic drivers that can be utilized in loudspeaker systems that utilize drivers having a magnetic negative spring (MNS). The MNS has an asymmetrical magnet design so that it can cancel or partially cancel the differential air pressure force that is different between inward and outward movement of a sound panel.

In general, in one aspect, the invention features a loudspeaker. The loudspeaker includes a sealed enclosure. The loudspeaker further includes a sound panel mechanically connected to the sealed enclosure. The loudspeaker further includes a moveable armature mechanically connected to the sound panel comprising an actuator operable to convert electrical energy into mechanical energy. The moveable armature is operable for moving the sound panel toward the sealed enclosure to create a first air pressure force and away from the sealed enclosure to create a second air pressure force. The loudspeaker further includes a plurality of armature permanent magnets mechanically connected to the moveable armature. The loudspeaker further includes a plurality of stator permanent magnets that are stationary relative to the sealed enclosure. The plurality of armature permanent magnets and the plurality of stator permanent magnets are operable to provide a first magnetic force when the sound panel is moving toward the sealed enclosure and a second magnetic force when the sound panel is moving away from the sealed enclosure. The first magnetic force is oppositely directed to the first air pressure force. The second magnetic force is oppositely directed to the second air pressure force. The magnitude of the first air pressure force is on average higher than the magnitude of the second air pressure force.

Implementations of the invention can include one or more of the following features:

The magnitude of the first magnetic force can be on average higher than the magnitude of the second magnetic force.

The moveable armature can be operable for moving the sound panel a first maximum predetermined distance toward the sealed enclosure. The moveable armature can be operable for moving the sound panel a second maximum predetermined distance and away from the sealed enclosure. The second maximum predetermined distance can be greater than the first maximum predetermined distance.

The magnitude of the first magnetic force can operatively increase linearly as the sound panel is moved toward the sealed enclosure. The magnitude of the second magnetic force can operatively increase linearly as the sound panel is moved away from the sealed enclosure.

The magnitude of the first magnetic force can be on average higher than the magnitude of the second magnetic force.

The plurality of stator permanent magnets can include a first array of stator permanent magnets having a first axial length along the first direction. The plurality of stator permanent magnets can further include a second array of stator permanent magnets having a second axial length along the first direction. The first axial length can be different than the second axial length.

The second axial length can be between 10% and 25% greater than the first axial length.

The plurality of armature permanent magnets can include a first array of armature permanent magnets positioned at a first axial location in the first direction on the movable armature and having a first total magnet mass. The plurality of armature permanent magnets can further include a second array of armature permanent magnets positioned at a second axial location in the first direction on the movable armature and having a second total magnet mass. The first total magnet mass can be different than the second total magnet mass.

The first total magnet mass can be between 10% and 25% greater than the first total magnet mass.

The first array of armature permanent magnets can have a first number of permanent magnets. The second array of armature permanent magnets can have a second number of permanent magnets. The second number of permanent magnets can be less than the first number of permanent magnets.

The first array of armature permanent magnets can include magnets of a first size. The second array of armature permanent magnets can include magnets of a second size. The second size can be less than the first size.

The distance between the first array of armature permanent magnets and the sound panel can be less than the distance between the second array of armature permanent magnets and the sound panel.

The first array of armature permanent magnets and second array of armature permanent magnets can have an equal number of permanent magnets.

The first array of armature permanent magnets and second array of armature permanent magnets can have an unequal number of permanent magnets.

The number of magnets in the first array of armature permanent magnets can be greater than the number of magnets in the second array of armature permanent magnets.

The total mass of magnet material in the first array of armature permanent magnets can be greater than the total mass of magnet material in the second array of armature permanent magnets.

The average energy product of the magnet material in the first array of armature permanent magnets can be greater than the average energy product of the magnet material in the second array of armature permanent magnets.

The loudspeaker can include a hub that is mechanically connected to the sound panel and moveable armature.

The magnets within the plurality of armature permanent magnets can be triangle shaped.

The magnets within the plurality of armature permanent magnets can be arc shaped.

The actuator can include a voice coil.

The actuator can include a pair of voice coils.

The plurality of first stator magnets can include a first stator magnet having a first axial length along the first direction and a second stator magnet having a second axial length along the first direction.

The distance between the first stator magnet and the sound panel can be greater than the distance between the second stator magnet and the sound panel.

The first axial length can be equal to the second axial length.

The first axial length can be less than the second axial length.

The first stator magnet and the second stator magnet can be ring shaped.

The first stator magnet can include a first inner stator magnet and a first outer stator magnet. The second stator magnet can include a second inner stator magnet and a second outer stator magnet.

The first inner stator magnet can have a smaller diameter than the first outer stator magnet. The second inner stator magnet can have a smaller diameter than the second outer stator magnet.

DETAILED DESCRIPTION

The present invention is directed to electroacoustic drivers and loudspeakers that have and use same, and in particular drivers having a magnetic negative spring (MNS) (such as permanent magnet crown (PMC) drivers) and loudspeakers that have and use same. It has been discovered that large pressure forces on the sound panel (of an audio speaker) can be cancelled, or partially cancelled, by using a MNS that uses fewer permanent magnets that are connected to the armature (for example 12 arc magnets, as compared to 20 triangle-shaped magnets), and which are smaller and lighter. The magnets utilized can be asymmetrical in design, such as by having an asymmetrical array of arc magnets (such as shown in FIG. 5).

Figure 4:
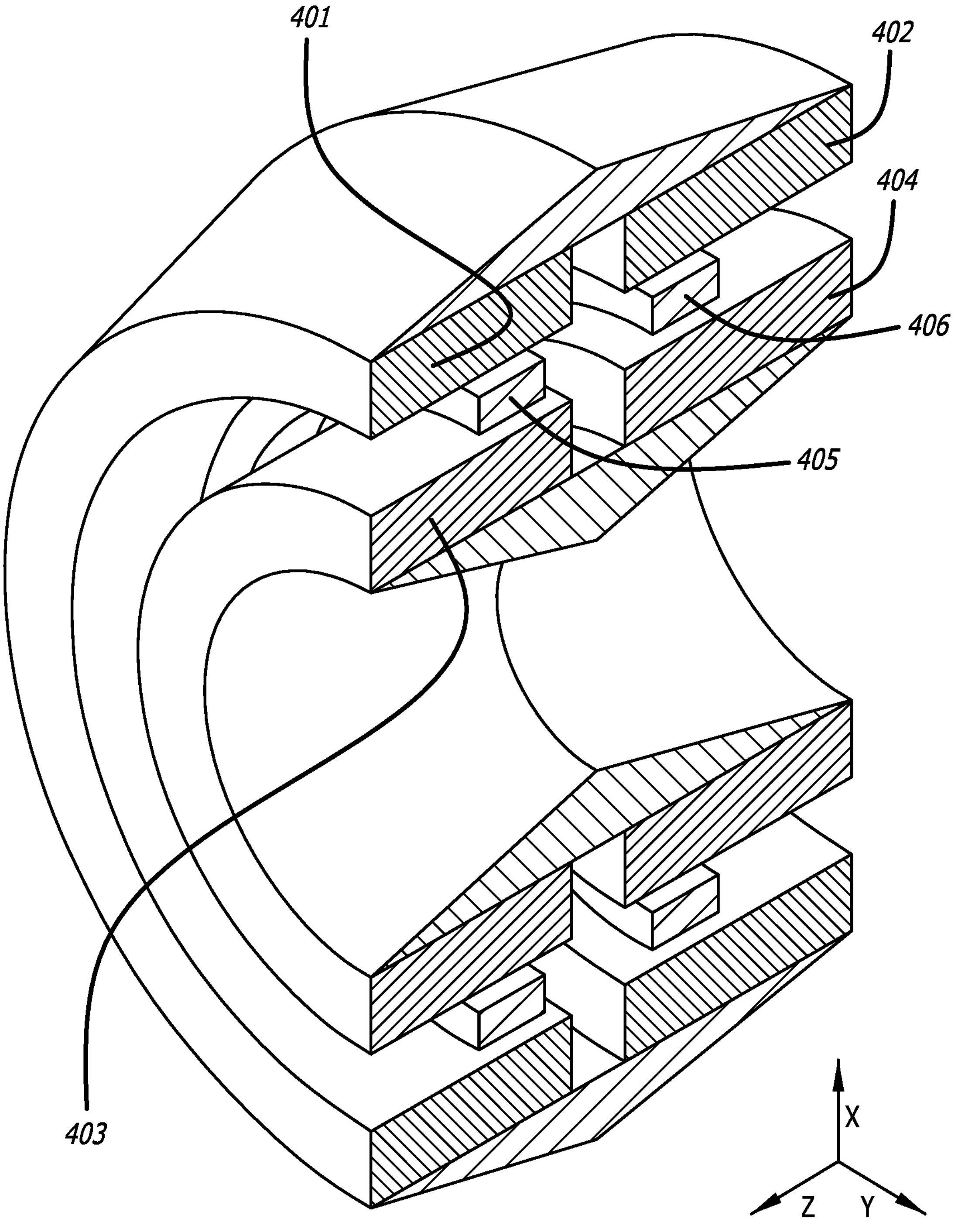
FIG. 4 is an illustration of a perspective view showing certain parts (mainly the permanent magnets) of an improved repulsive/attractive MNS.

In FIG. 4, stationary permanent magnets 401 and 403 have a first length in the z-direction and stationary permanent magnets 402 and 404 have a second length in the z-direction, which second length can be between around 10% to around 25% greater in length than the first length. (Stationary permanent magnets 401 and 403 are positioned in the negative z-direction relative to stationary permanent magnets 402 and 404). The magnetic negative spring has arc magnets 405 and 406, which are generally the same size (including length in the z-direction). As shown in FIG. 4, the number of the arc magnets 405 can be the same as the number of arc magnets 406.

Figure 5:
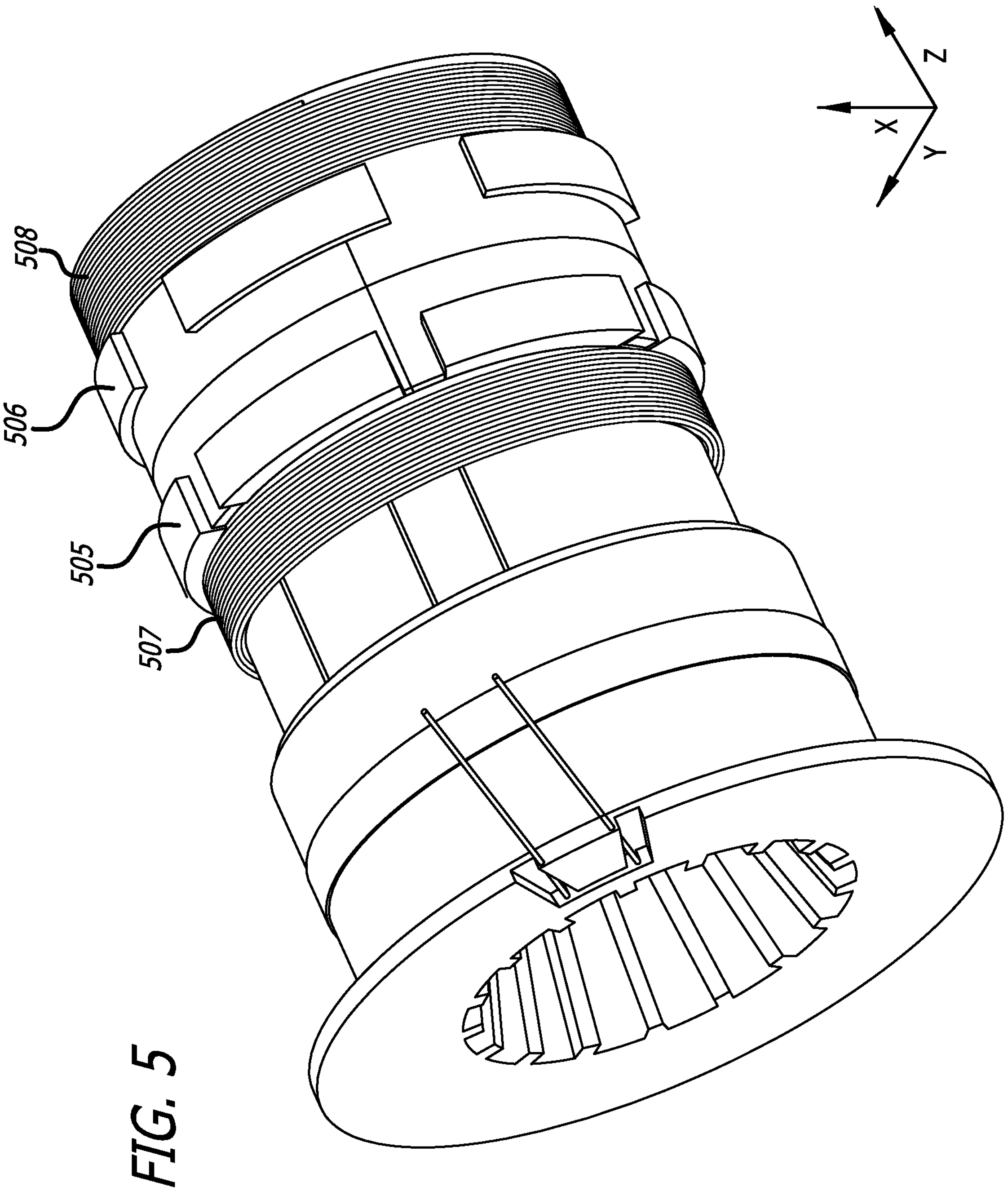
FIG. 5 is an illustration of a perspective view of an alternative armature that can be used in the improved repulsive/attractive MNS shown FIG. 4.

FIG. 5 shows an alternative armature in which the number of arc magnets 505 is greater than the number of arc magnets 506, with the arc magnets being generally the same size (including length in the z-direction). Arc magnets 505 are positioned in the negative z-direction relative to arc magnets 506.

Figure 1:
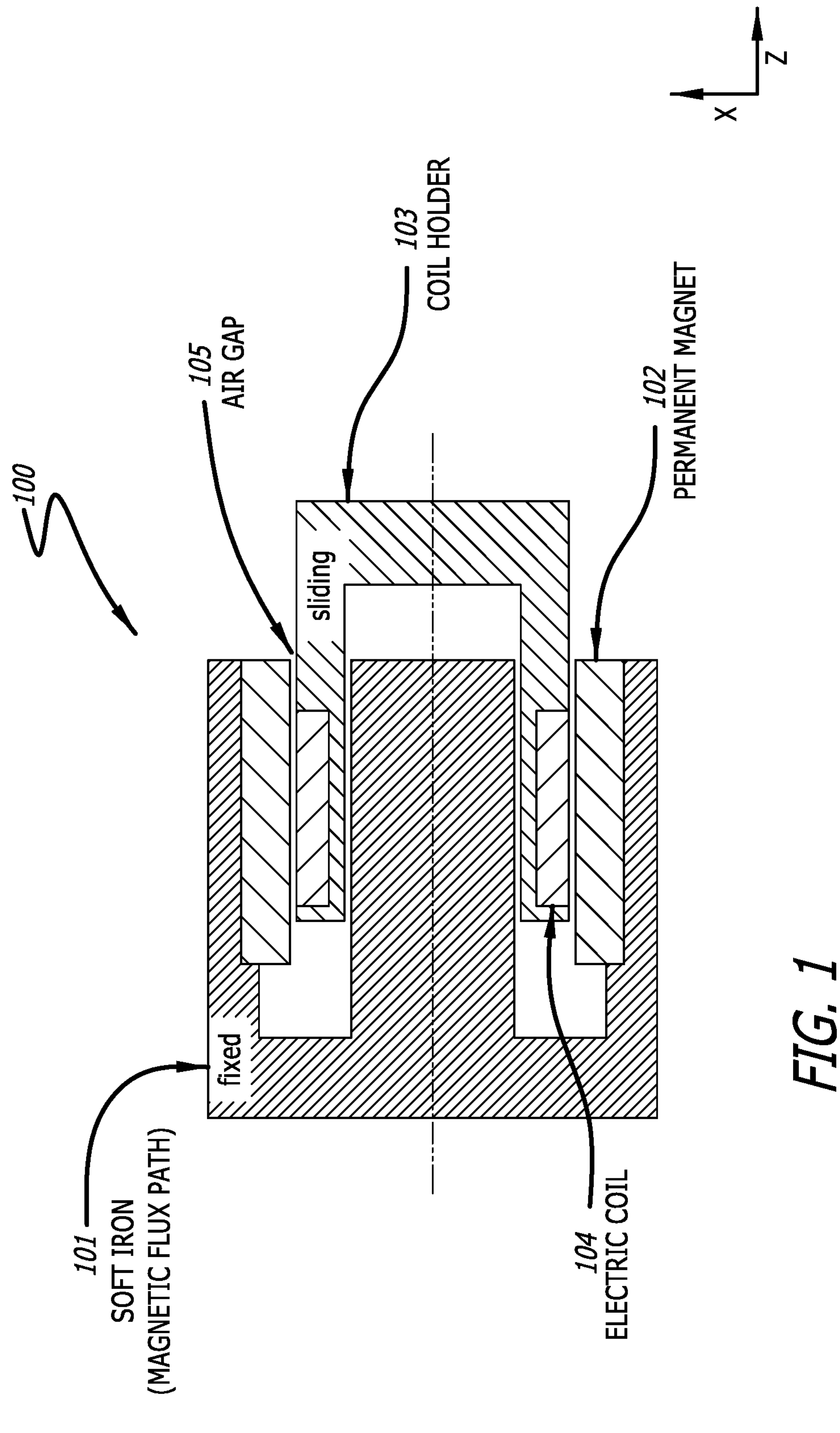
FIG. 1 (Prior Art)
FIG. 1 is a schematic of a cross-sectional view of a prior art audio force transducer.
Figure 2A:
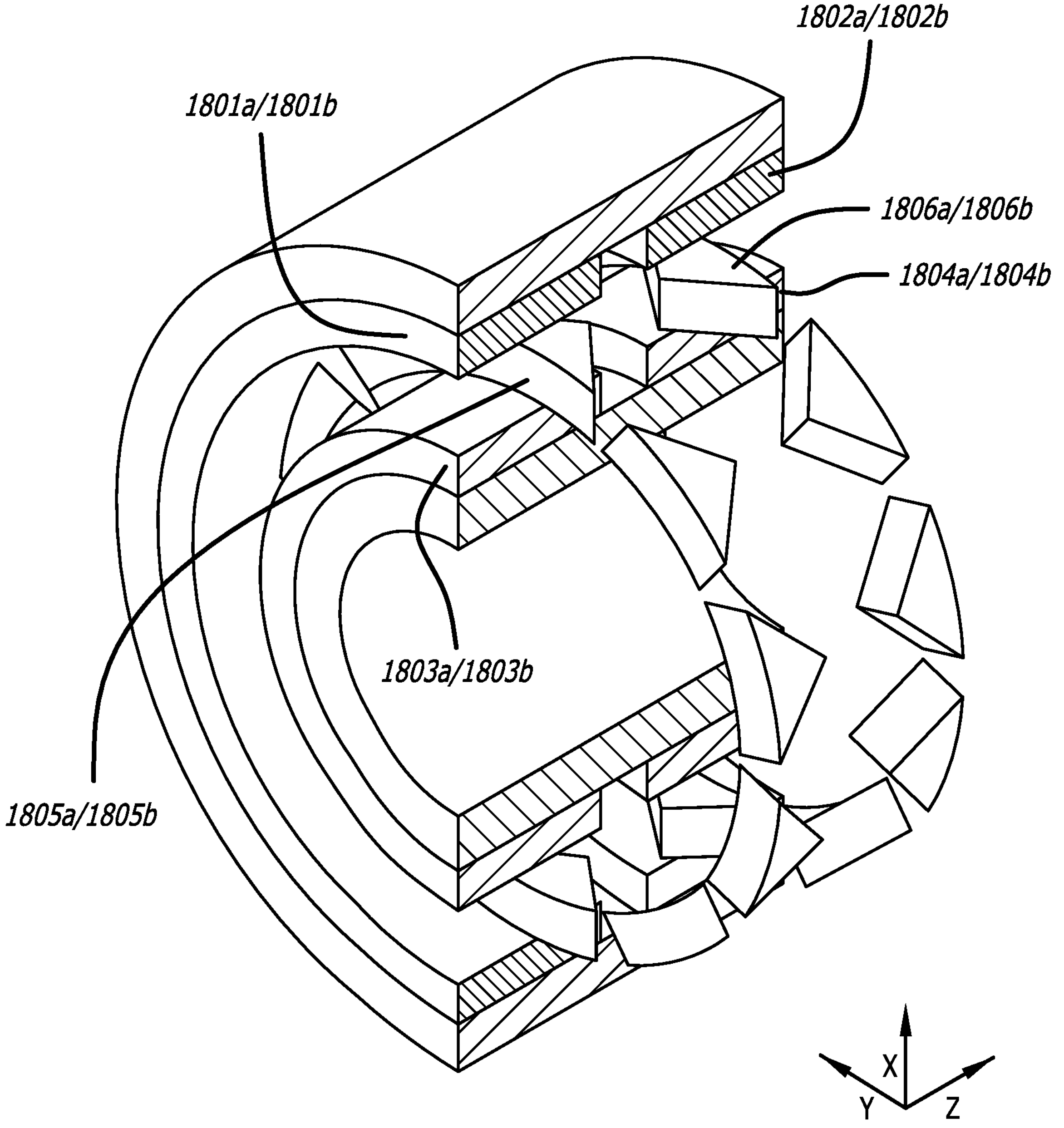
FIG. 2A (Prior Art)
FIG. 2A (which is FIG. 18D of the Pinkerton '633 PCT Application) is an illustration of a perspective view showing certain parts (mainly the permanent magnets) of a prior art repulsive/attractive MNS.

The alternative armature shown in FIG. 5, can be used in conjunction with the arrangement of stationary permanent magnets 401-404 shown in FIG. 4, or can be used in conjunction with the stationary permanent magnets having magnetic poles 1801*a*/1801*b*, 1802*a*/1802*b*, 1803*a*/1803*b*, and 1804*a*/1804*b* shown in FIG. 2A.

Figure 2B:
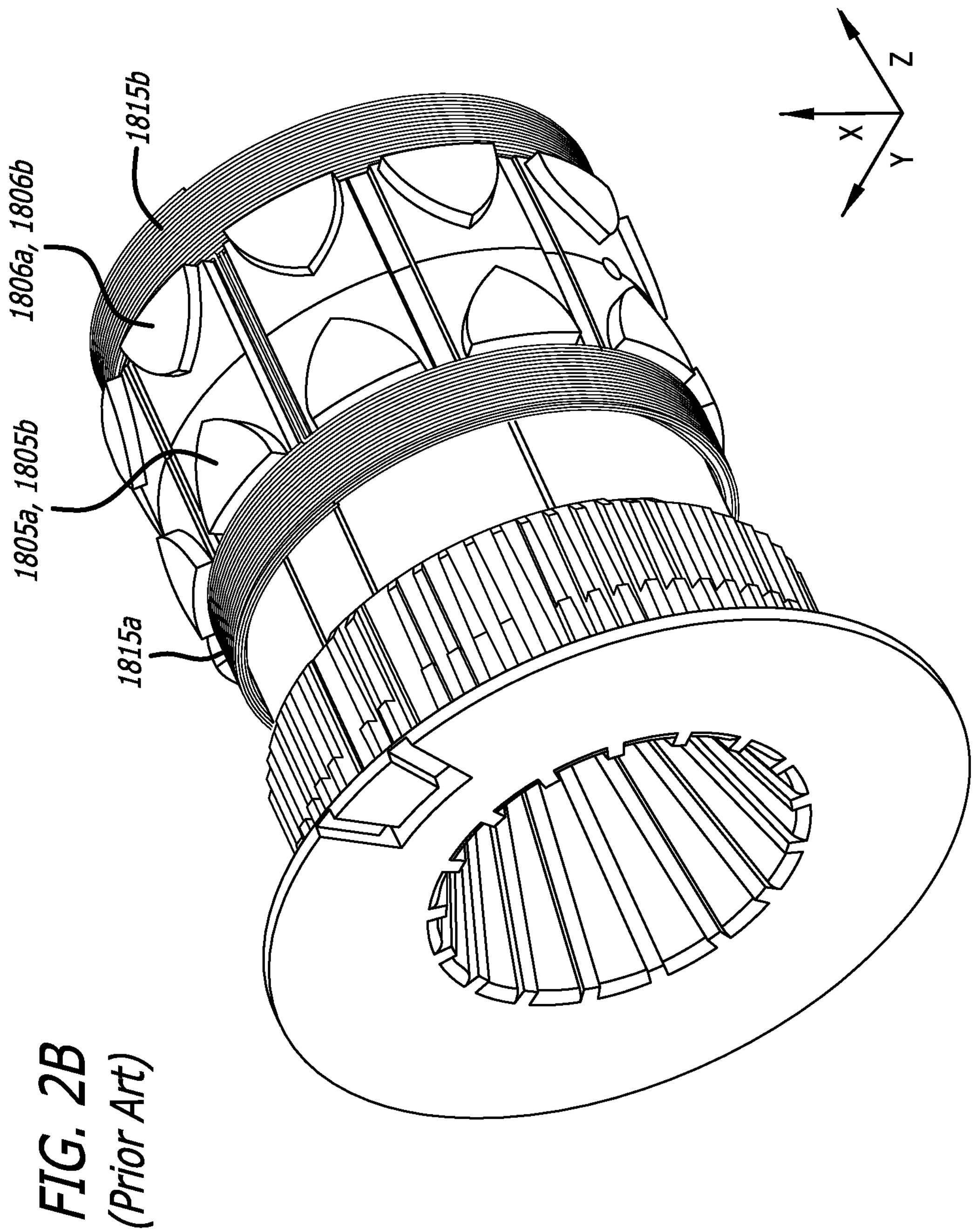
FIG. 2B (Prior Art)
FIG. 2B is an illustration of a perspective view of the armature that was utilized in the prior art repulsive/attractive MNS shown in FIG. 2A.
Figure 3:
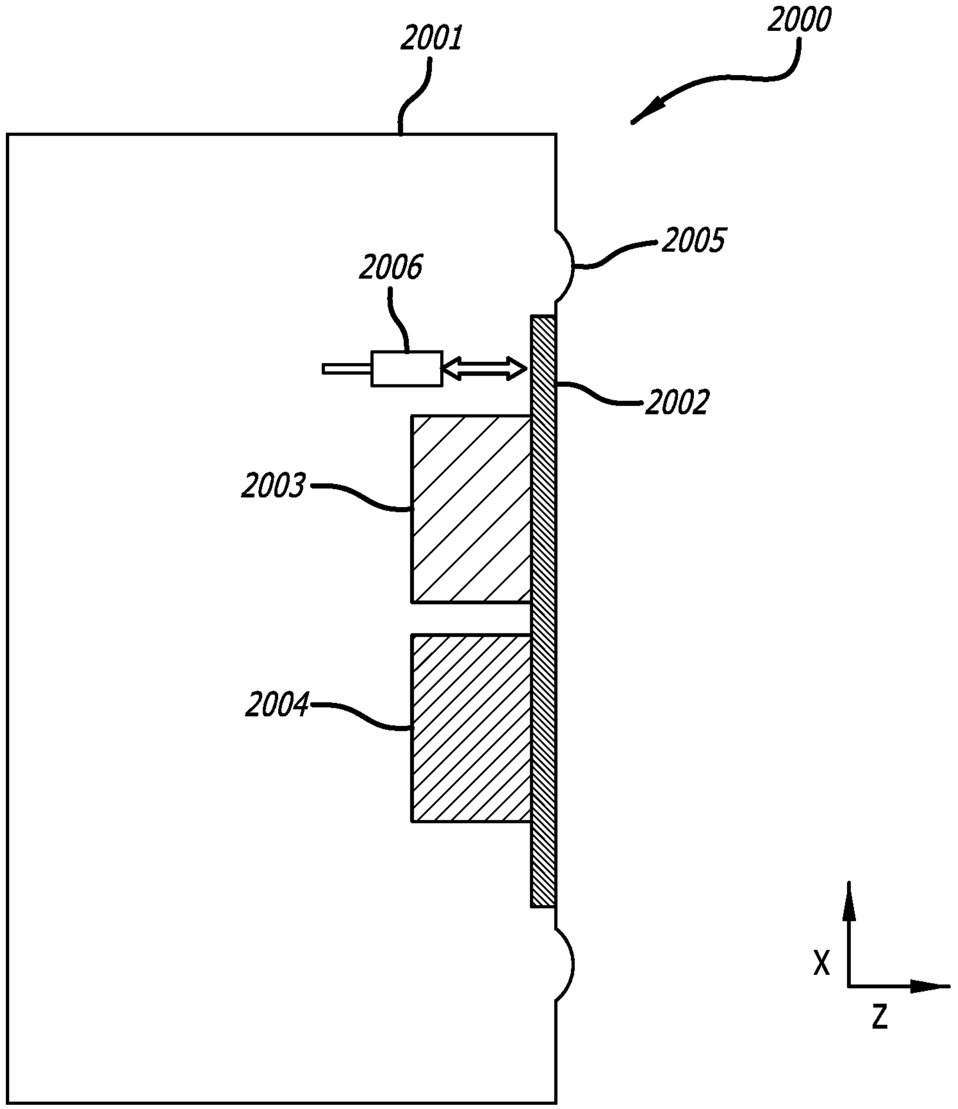
FIG. 3 (Prior Art)
FIG. 3 (which is FIG. 20 of the Pinkerton '633 PCT Application (with a change of orientation of the z-axis) is a schematic of a loudspeaker in which an MNS (such as shown in FIG. 2A) can be utilized.

Alternatively, the arc magnets can have different energy products, with the arc magnets positioned in the negative z-direction having a greater a greater energy product than the arc magnets positioned in the positive z-direction, such as by an amount that is 10% to 25% difference in energy product. Again, these arc magnets can be used in conjunction with the arrangement of stationary permanent magnets as shown in FIG. 2 and FIG. 4.

The moveable permanent magnet rings, such as shown in FIG. 4, can be an assemblage of arc segments that, when combined, create a ring magnet structure. As compared to the triangle shaped magnets shown in FIG. 2, these arc magnets can be fewer in number (approximately 12 arc magnets in place of 20 triangle-shaped magnets), smaller and lighter. The smaller axial length of the permanent magnet arcs also leaves more axial room for the voice coil (such as voice coils 507-508 shown in FIG. 5) and this results in an increase in voice coil efficiency.

In these embodiments, the MNS lowers the net force on the armature voice coil by roughly 10 times relative to conventional speaker voice coils. Accordingly, the size of the speaker enclosure can be significantly decreased without burning excessive power in the voice coil. A smaller speaker enclosure results in much higher internal air pressure changes (plus or minus approximately 10,000 Pascal for a MNS speaker versus about plus or minus approximately 1000 Pascal for a conventional speaker) for a given sound pressure level output.

Additionally, the difference between positive air pressure (when the sound panel moves in toward the sealed chamber, which as shown in FIGS. 2-5 is the positive z-direction) and negative air pressure (when the sound panel moves away from the sealed chamber, which as shown in FIGS. 2-5 is the negative z-direction becomes much more pronounced. This air pressure differential results in the sound panel moving less inward than it moves outward (for example the sound panel might move 6 mm inward and 8 mm outward). Asymmetrical sound panel motion results in some audio distortion and also limits peak-to-peak panel motion (ideally this axial motion would be plus/minus 8 mm in the previous example).

It has been discovered that the asymmetrical air pressure force can be partially cancelled with an asymmetrical MNS force. For example, and as discussed above for FIG. 4, one way to do this is to make one set of stationary permanent magnets axially longer in the z-direction than the other. Stationary permanent magnets 401 and 403 can be 15 mm long axially (z-direction) and stationary permanent magnets 402 and 404 can be 17 mm long axially (z-direction).

The interaction between the armature magnets 405-406 with the stationary permanent magnets 401-404 moves the armature in the negative z-direction when the sound panel is moving away from the sealed enclosure.

Figure 6:
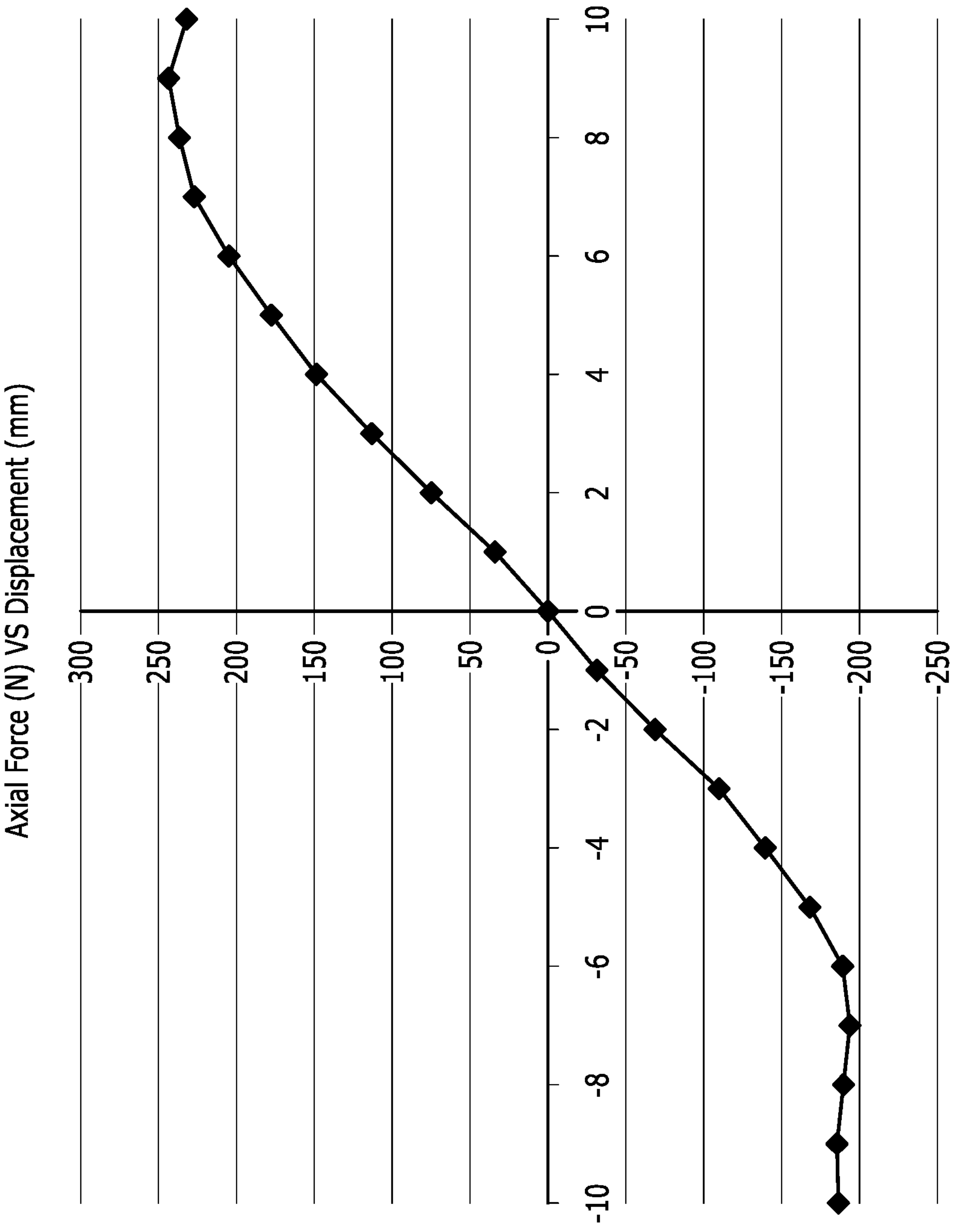
FIG. 6 is a graph showing axial force versus displacement for the improved repulsive/attractive MNS of the present invention.

As shown in FIG. 6 (which shows the axial MNS force versus displacement), this results in a relatively low differential magnetic force that almost perfectly cancels the relatively low differential air pressure force in the 0 to 9 mm range (the full range of motion for the speaker sound panel in the outward direction). The graph of FIG. 6 shows a lower MNS force for negative z displacements (which should be matched for the panel moving away from the case).

The stationary permanent magnets 401-404 move the armature in the positive (once z arrow is reversed in FIG. 4) z-direction when the sound panel is moving toward the sealed enclosure. As also shown in FIG. 6, this results in a relatively high differential magnetic force that almost perfectly cancels the relatively high differential air pressure force in the 0 to 9 mm range (the full range of motion for the speaker sound panel in the inward direction).

Another way to create a differential magnetic force is shown in FIG. 5. Armature arc magnet array 505 contains six armature magnets, and armature arc magnet array 506 contains five armature magnets. This design will create a higher armature magnetic force when the armature moves in the positive z-direction (when the sound panel moves into the sealed chamber) and a lower magnetic force when the armature moves in the negative z-direction (when the sound panel moves away from the sealed chamber).

These embodiments (and methods) produce differential armature magnetic forces that can also be used to remove some of the unwanted nonlinearity of speaker armature "spider" supports. The stiffness of a speaker spider is usually about twice as high at the end of its travel than at the beginning of its travel and this creates audio distortion. Differential armature magnetic forces can be used to cancel some of the spider force near the end of its travel and thus make its net stiffness more linear over the full range of sound panel motion. This configuration results in a sound panel motion that is more linear with voice coil current and thus reduces audio distortion.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. A loudspeaker comprising:
(a) a sealed enclosure;
(b) a sound panel mechanically connected to the sealed enclosure;
(c) a moveable armature mechanically connected to the sound panel comprising an actuator operable to convert electrical energy into mechanical energy, wherein the moveable armature is operable for moving the sound panel toward the sealed enclosure to create a first air pressure force and away from the sealed enclosure to create a second air pressure force;
(d) a position and/or velocity sensor that is positioned to sense movement of the sound panel; and
(e) a negative spring that has a first negative spring portion that is mechanically connected to the moveable armature and a second negative spring portion that is stationary relative to the sealed enclosure, wherein
(i) the negative spring is operable to provide a first negative spring force when the sound panel is moving toward the sealed enclosure and a second negative spring force when the sound panel is moving away from the sealed enclosure,
(ii) the first negative spring force is oppositely directed to the first air pressure force,
(iii) the second negative spring force is oppositely directed to the second air pressure force, and
(iv) magnitude of the first air pressure force is on average higher than magnitude of the second air pressure force.

2. The loudspeaker of claim 1, wherein magnitude of the first negative spring force is on average higher than magnitude of the second negative spring force.

3. The loudspeaker of claim 1, wherein
(a) the moveable armature is operable for moving the sound panel a first maximum predetermined distance toward the sealed enclosure;
(b) the moveable armature is operable for moving the sound panel a second maximum predetermined distance and away from the sealed enclosure;
(c) the second maximum predetermined distance is greater than the first maximum predetermined distance.

4. The loudspeaker of claim 1, wherein
(a) magnitude of the first negative spring force operatively increases linearly as the sound panel is moved toward the sealed enclosure;
(b) magnitude of the second negative spring force operatively increases linearly as the sound panel is moved away from the sealed enclosure.

5. The loudspeaker of claim 4, wherein the magnitude of the first negative spring force is on average higher than the magnitude of the second negative spring force.

6. The loudspeaker of claim 1 further comprising a hub that is mechanically connected to the sound panel and moveable armature.

7. The loudspeaker of claim 1, wherein the actuator comprises a voice coil.

8. The loudspeaker of claim 1, wherein the actuator comprises a pair of voice coils.

9. The loudspeaker of claim 1, wherein the negative spring is a magnetic negative spring.

10. The loudspeaker of claim 9, wherein
(a) the first negative spring portion is a plurality of armature permanent magnets mechanically connected to the moveable armature; and
(b) the second negative spring portion is a plurality of stator permanent magnets that are stationary relative to the sealed enclosure, wherein
(i) the plurality of armature permanent magnets and the plurality of stator permanent magnets are operable to provide a first magnetic force that is the first negative spring force and a second magnetic force that is the second negative spring force.

11. The loudspeaker of claim 10, wherein
(a) the plurality of stator permanent magnets comprises
(i) a first array of stator permanent magnets having a first axial length along the first direction, and
(ii) a second array of stator permanent magnets having a second axial length along the first direction, and
(b) the first axial length is different than the second axial length.

12. The loudspeaker of claim 11, wherein the second axial length is between 10% and 25% greater than the first axial length.

13. The loudspeaker of claim 10, wherein
(a) the plurality of armature permanent magnets comprises
(i) a first array of armature permanent magnets positioned at a first axial location in the first direction on the movable armature and having a first total magnet mass, and
(ii) a second array of armature permanent magnets positioned at a second axial location in the first direction on the movable armature and having a second total magnet mass, and
(b) the first total magnet mass is different than the second total magnet mass.

14. The loudspeaker of claim 13, wherein the first total magnet mass is between 10% and 25% greater than the first total magnet mass.

15. The loudspeaker of claim 14, wherein
(a) the first array of armature permanent magnets has a first number of permanent magnets,
(b) the second array of armature permanent magnets has a second number of permanent magnets, and
(c) the second number of permanent magnets is less than the first number of permanent magnets.

16. The loudspeaker of claim 14, wherein
(a) the first array of armature permanent magnets comprises magnets of a first size,
(b) the second array of armature permanent magnets comprises magnets of a second size, and
(c) the second size is less than the first size.

17. The loudspeaker of claim 14, wherein distance between the first array of armature permanent magnets and the sound panel is less than distance between the second array of armature permanent magnets and the sound panel.

18. The loudspeaker of claim 17, wherein the first array of armature permanent magnets and second array of armature permanent magnets have an equal number of permanent magnets.

19. The loudspeaker of claim 17, wherein the first array of armature permanent magnets and second array of armature permanent magnets have an unequal number of permanent magnets.

20. The loudspeaker of claim 19, wherein the number of magnets in the first array of armature permanent magnets is greater than the number of magnets in the second array of armature permanent magnets.

21. The loudspeaker of claim 17, wherein the total mass of magnet material in the first array of armature permanent magnets is greater than the total mass of magnet material in the second array of armature permanent magnets.

22. The loudspeaker of claim 17, wherein the average energy product of the magnet material in the first array of armature permanent magnets is greater than the average energy product of the magnet material in the second array of armature permanent magnets.

23. The loudspeaker of claim 10, wherein the magnets within the plurality of armature permanent magnets are triangle shaped.

24. The loudspeaker of claim 10, wherein the magnets within the plurality of armature permanent magnets are arc shaped.

25. The loudspeaker of claim 10, wherein the plurality of first stator magnets comprises a first stator magnet having a first axial length along the first direction and a second stator magnet having a second axial length along the first direction.

26. The loudspeaker of claim 25, wherein the distance between the first stator magnet and the sound panel is greater than the distance between the second stator magnet and the sound panel.

27. The loudspeaker of claim 26, wherein the first axial length is equal to the second axial length.

28. The loudspeaker of claim 26, wherein the first axial length is less than the second axial length.

29. The loudspeaker of claim 25, wherein the first stator magnet and the second stator magnet are ring shaped.

30. The loudspeaker of claim 25, wherein (a) the first stator magnet comprises a first inner stator magnet and a first outer stator magnet, and (b) the second stator magnet comprises a second inner stator magnet and a second outer stator magnet.

31. The loudspeaker of claim 30, wherein (a) the first inner stator magnet has a smaller diameter than the first outer stator magnet, and (b) the second inner stator magnet has a smaller diameter than the second outer stator magnet.

* * * * *